(12) United States Patent
Yokokura

(10) Patent No.: US 8,194,273 B2
(45) Date of Patent: Jun. 5, 2012

(54) PROGRAM TRANSMISSION SYSTEM, PROGRAM TRANSMISSION METHOD, AND STORAGE MEDIUM STORING CONTROL PROGRAM TO TRANSMIT SOFTWARE FROM A SERVER TO A DEVICE

(75) Inventor: Hidenori Yokokura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 12/493,225

(22) Filed: Jun. 28, 2009

(65) Prior Publication Data

US 2010/0005352 A1 Jan. 7, 2010

(30) Foreign Application Priority Data

Jul. 1, 2008 (JP) ................................. 2008-172804

(51) Int. Cl.
*G06F 3/12* (2006.01)
*G06F 9/44* (2006.01)
(52) U.S. Cl. ...................... 358/1.15; 358/1.13; 358/1.16; 717/168; 717/171; 717/172; 717/173; 717/177
(58) Field of Classification Search .................. 358/1.1, 358/1.14, 1.9, 1.13, 1.15, 1.16; 717/168–178
See application file for complete search history.

(56) References Cited

U.S. PATENT DOCUMENTS

| | | | | |
|---|---|---|---|---|
| 5,537,626 A * | 7/1996 | Kraslavsky et al. ............. 710/8 |
| 6,601,212 B1 * | 7/2003 | Guha et al. .................... 714/776 |
| 6,678,888 B1 * | 1/2004 | Sakanishi ...................... 717/172 |
| 6,735,641 B1 * | 5/2004 | Kobayashi et al. ............. 710/15 |
| 6,873,806 B2 * | 3/2005 | Kobayashi et al. ............. 399/80 |
| 7,516,450 B2 * | 4/2009 | Ogura .......................... 717/168 |
| 7,600,018 B2 * | 10/2009 | Maekawa et al. ............. 709/224 |
| 7,876,469 B2 * | 1/2011 | Hanada ......................... 358/1.16 |
| 7,944,574 B2 * | 5/2011 | Johnson et al. .............. 358/1.15 |
| 2003/0035135 A1 * | 2/2003 | Corrales ....................... 358/1.15 |
| 2004/0103411 A1 * | 5/2004 | Thayer ......................... 717/171 |
| 2004/0109193 A1 * | 6/2004 | Smith et al. .................. 358/1.14 |
| 2004/0148379 A1 * | 7/2004 | Ogura .......................... 709/223 |
| 2004/0184063 A1 * | 9/2004 | Baldwin ...................... 358/1.13 |
| 2007/0055970 A1 * | 3/2007 | Sakuda et al. ................ 717/168 |
| 2007/0216938 A1 * | 9/2007 | Tomita ......................... 358/1.15 |

FOREIGN PATENT DOCUMENTS

JP 2004-165734 A 6/2004

* cited by examiner

*Primary Examiner* — Twyler Haskins
*Assistant Examiner* — Dennis Dicker
(74) *Attorney, Agent, or Firm* — Canon U.S.A., Inc. IP Division

(57) ABSTRACT

A program transmission system in which a program is transmitted from a transmission apparatus to an image forming apparatus is provided. The program transmission system includes an acquisition unit configured to acquire operational state information about an operational state in the image forming apparatus, a determination unit configured to determine timing to transmit the program to the image forming apparatus according to the operational state based on the operational state information acquired by the acquisition unit, and a transmission unit configured to transmit the program from the transmission apparatus to the image forming apparatus according to the timing determined by the determination unit.

11 Claims, 8 Drawing Sheets

| KEY | UPDATE TIME |
|---|---|
| "SLP:REBOOT" | Immediately |
| "RDS:COUNTERERROR" | Less than 24 hours |
| "PCL:PROCESS ERROR" | Immediately |
| "SCON:SLEEP ERROR" | Before sleeping |
| "UI:MESSAGE ERROR" | Less than 24 hours |
| "REPORT:PRINT ERROR" | Before next time |

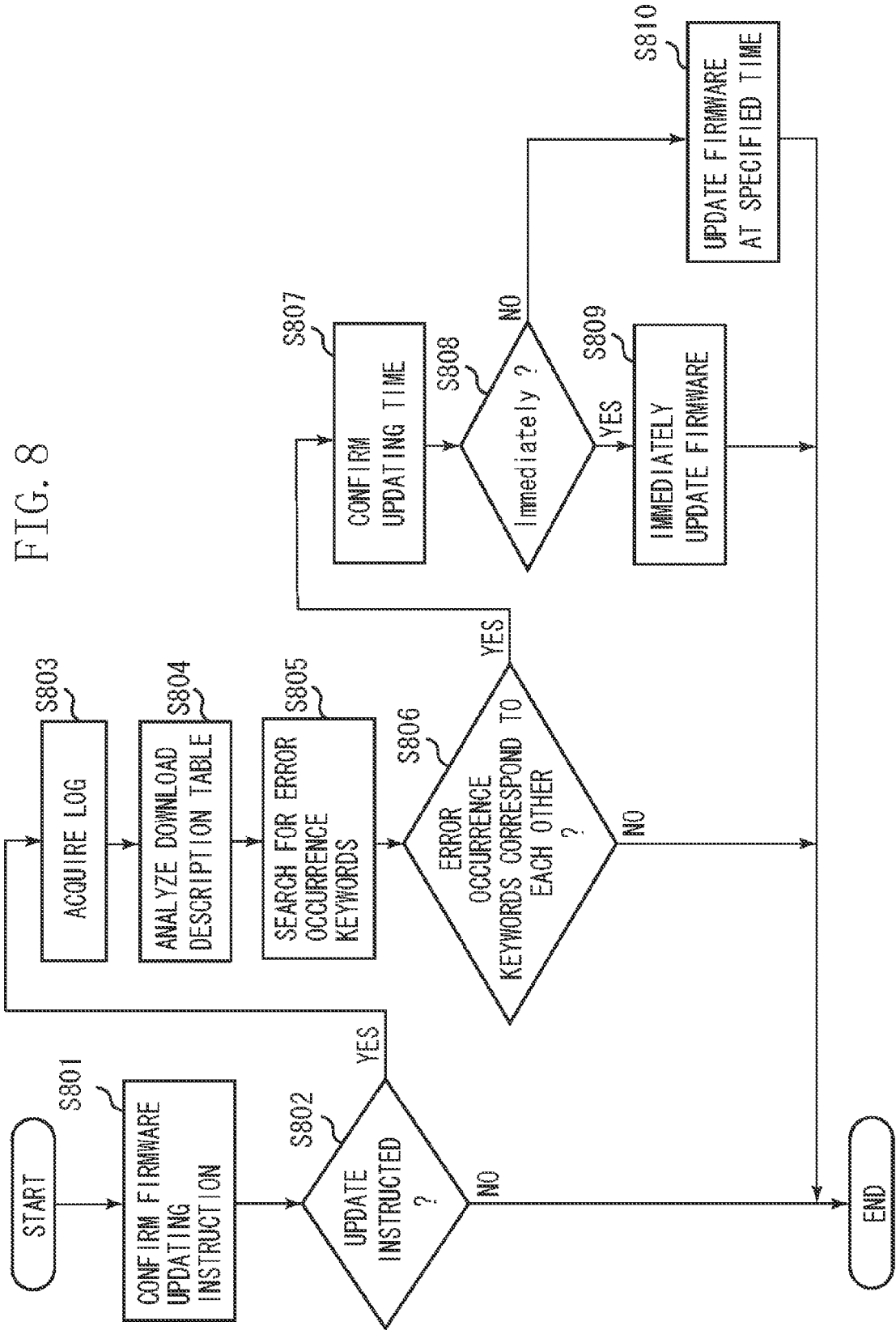

PROGRAM TRANSMISSION SYSTEM, PROGRAM TRANSMISSION METHOD, AND STORAGE MEDIUM STORING CONTROL PROGRAM TO TRANSMIT SOFTWARE FROM A SERVER TO A DEVICE

BACKGROUND OF THE INVENTION

1. Field of the Invention

The present invention relates to a software transmission system. Further, the present invention relates to a software transmission method and a computer program, and more particularly, relates to a technique to transmit software such as firmware from a server to a device.

2. Description of the Related Art

In order to deal with malfunction of firmware and add a function to a device such as a multifunction peripheral (MFP), systems to immediately or irregularly update the firmware have been developed. To realize such systems, various methods have been discussed. For example, there are a method in which a device receives firmware from a server via the Internet and updates the firmware, and a method in which a server transmits firmware to a device and updates the firmware on an intranet. A number of devices which are monitored by a server in a system has increased every year. Further, such systems are expected to be developed more and more in the future.

As a known technique for such a system, Japanese Patent Application Laid-Open No. 2004-165734 can be cited. In the technique, when firmware that has trouble is to be updated to new firmware, it is determined that which module the new firmware controls. Then, the module is stopped, and the new firmware is updated.

SUMMARY OF THE INVENTION

According to an aspect of the present invention, a program transmission system in which a program is transmitted from a transmission apparatus to an image forming apparatus is provided. The program transmission system includes an acquisition unit configured to acquire operational state information about an operational state in the image forming apparatus, a determination unit configured to determine timing to transmit the program to the image forming apparatus according to the operational state based on the operational state information acquired by the acquisition unit, and a transmission unit configured to transmit the program from the transmission apparatus to the image forming apparatus according to the timing determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating an example of processing performed in a server according to the second exemplary embodiment of the present invention.

DETAILED DESCRIPTION OF THE EMBODIMENTS

Various exemplary embodiments, features, and aspects of the invention will be described in detail below with reference to the drawings.

Figure 1:
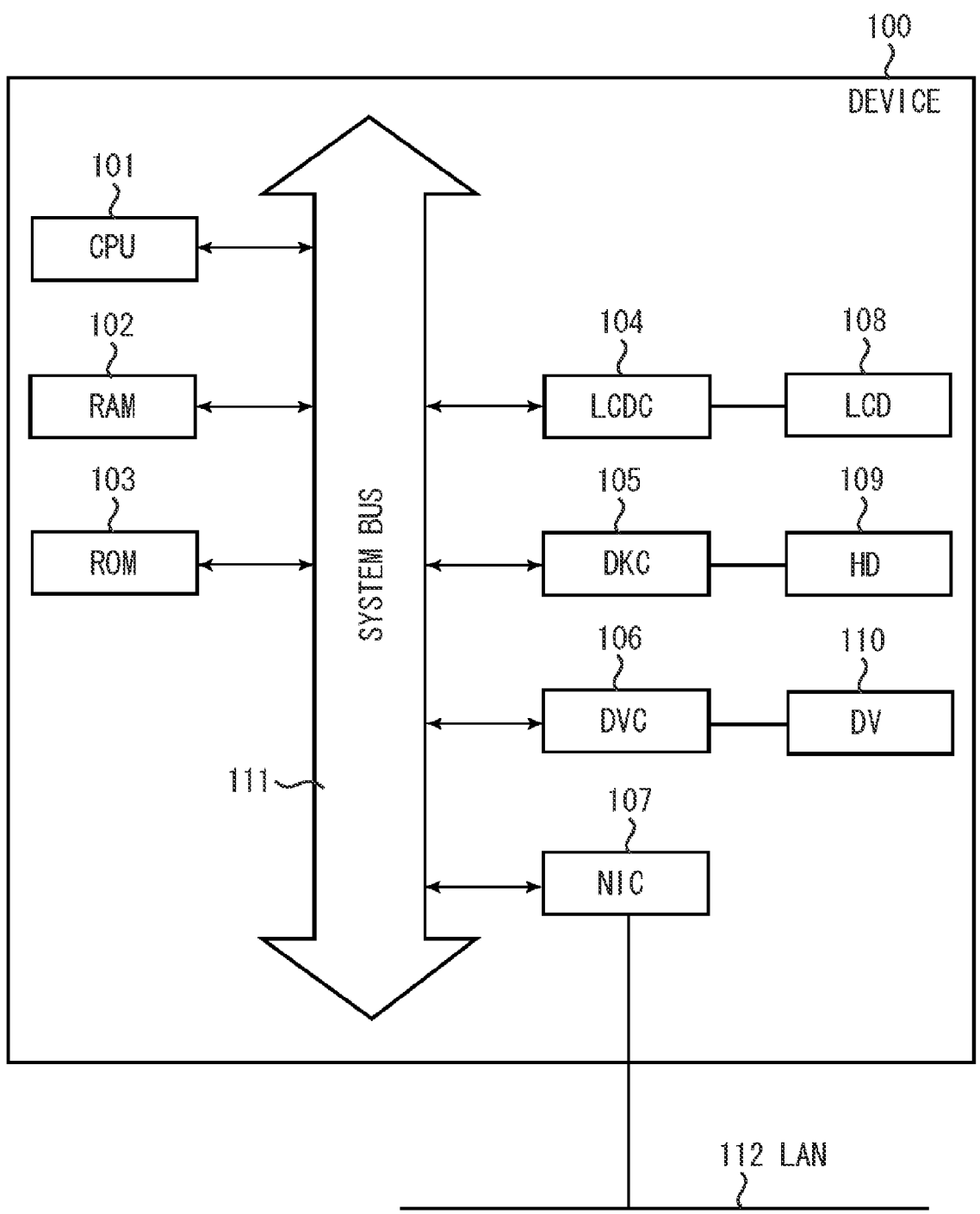
FIG. 1 illustrates an example of an internal configuration of a device according to a first exemplary embodiment of the present invention.

FIG. 1 illustrates an example of an internal configuration of a device according to a first exemplary embodiment of the present invention. In the present exemplary embodiment, a device 100 can be, for example, an MFP, and is realized by a configuration in which a network control unit and a device (a printer, a copying machine, a scanner, and a facsimile machine) control unit operate in a central processing unit (CPU) 101. The CPU 101 executes firmware stored in a read-only memory (ROM) 103. Further, the CPU 101 performs overall control of units 102 to 107 that are interconnected via a system bus 111. Further, the CPU 101 can update the firmware stored in the ROM 103 by receiving data from a server 200 (see FIGS. 2 and 3) that is interconnected via a network such as a local area network (LAN) 112.

A random access memory (RAM) 102 serves as a main memory, a work area, or the like of the CPU 101. The RAM 102 also serves as a backup RAM that stores a setting value of the device 100. A liquid crystal display controller (LCDC) 104 controls display of a liquid crystal display (LCD) 108. The LCD 108 has a function of a touch panel.

A disk controller (DKC) 105 controls a hard disk (HD) 109, and stores images and various user data. The device controller (DVC) 106 controls a device (DV) 110 such as a printer. A network interface card (NIC) 107 can communicate with the server 200 that is interconnected via the LAN 112 and can receive its own firmware, or the like.

The HD 109 may not be included. Further, as long as it can store data, a universal serial bus (USB) memory or the like may be used instead of the HD 109. Software such as the firmware may be stored in the ROM 103 or the HD 109. The device 100 has various switches for users to operate. The CPU 101 implements processing corresponding to an operation of the switch.

Figure 2:
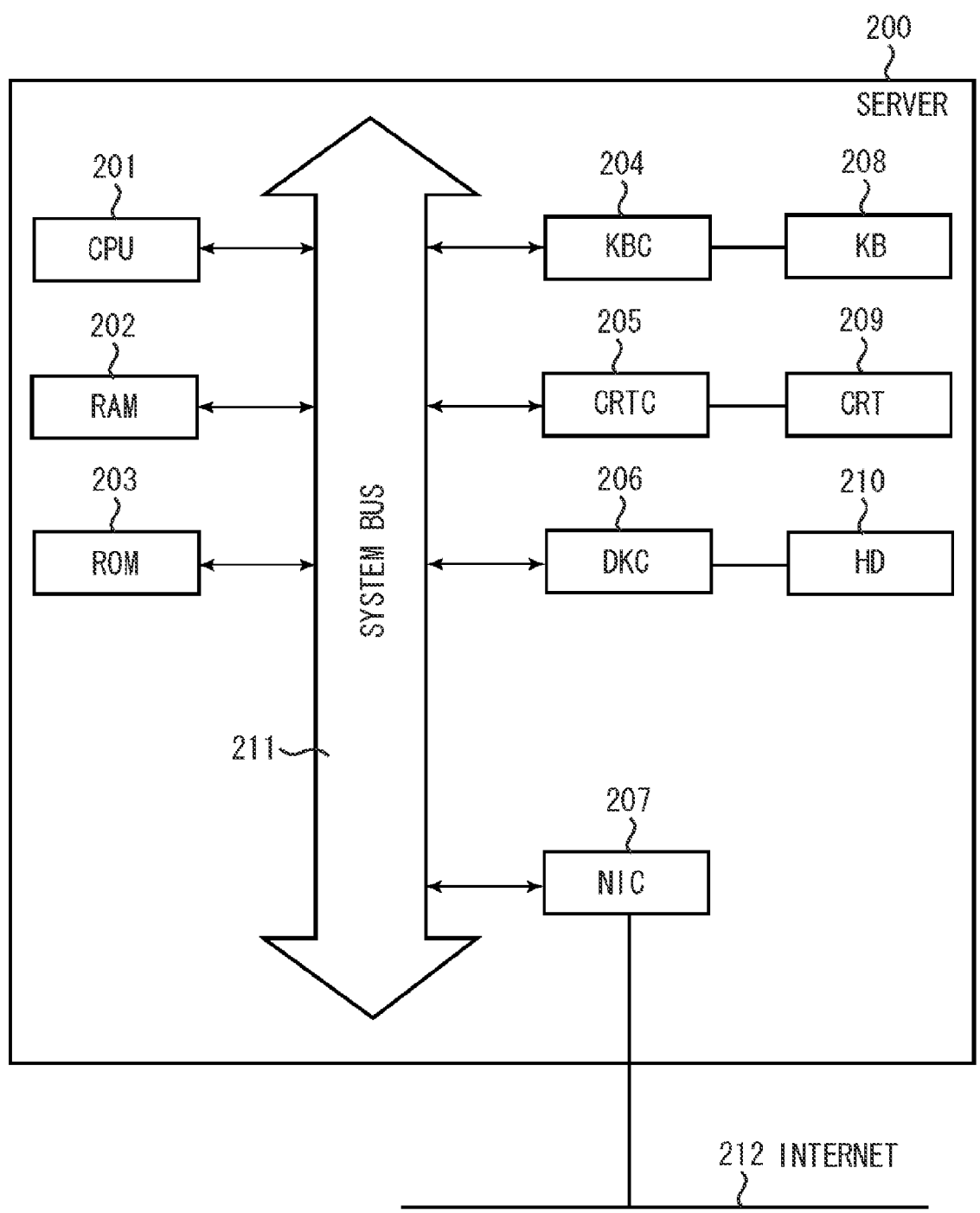
FIG. 2 illustrates an example of an internal configuration of a server according to the first exemplary embodiment of the present invention.

FIG. 2 illustrates an example of an internal configuration of the server 200.

A CPU 201 executes a program stored in a ROM 203, and performs overall control of units 202 to 207 that are interconnected via a system bus 211. A RAM 202 serves as a main memory, a work area, or the like of the CPU 201. The RAM 202 also serves as a backup RAM that stores a setting value of the server 200. A keyboard controller (KBC) 204 controls input from a keyboard (KB) 208. A cathode-ray tube controller (CRTC) 205 controls display of a cathode-ray tube (CRT) display 209.

A disk controller (DKC) 206 controls a hard disk (HD) 210. The DKC 206 enables the HD 210 to store a program. A network interface card (NIC) 207 can transmit firmware to the device 100 that is interconnected via the Internet 212.

The HD 210 may not be included. Further, as long as it can store data, a USB memory or the like may be used instead of the HD 210. The program may be stored in the ROM 203 or the HD 210.

Figure 3:
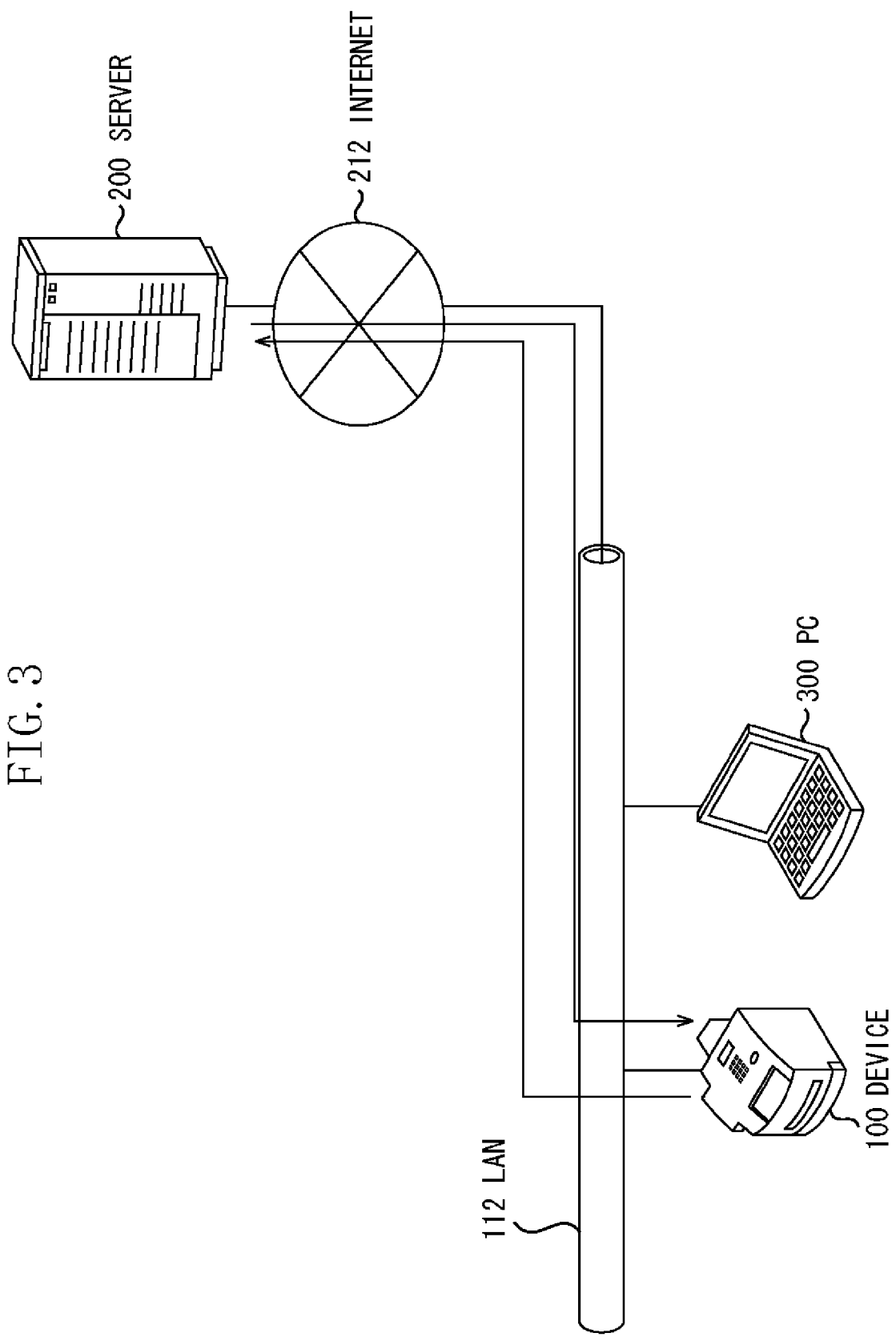
FIG. 3 illustrates an example of an entire configuration of a firmware transmission system according to the first exemplary embodiment of the present invention.

FIG. 3 illustrates an example of an entire configuration of a firmware transmission system according to the present exemplary embodiment of the present invention. In FIG. 3, each arrow between the device 100 and the server 200 indicates a flow of data or an instruction.

The device 100 can receive a print job from a personal computer (PC) 300 and perform copying according to operation of a user. The device 100 regularly checks the server 200 whether an instruction to update its own firmware is issued. The server 200 can update a download description file (described below with reference FIG. 4) and transmit updatable firmware to the device 100.

The configurations of the server 200, the device 100, and the PC 300 are not limited to those illustrated in FIGS. 1 to 3, and a combination of one or a plurality of the server 200, the device 100, and the PC 300 may be used. Further, the server 200 may be configured without using the Internet 212.

As described above, in the present exemplary embodiment, for example, an example of a device is realized by the device 100, and an example of a transmission device is realized by the server 200.

Figure 4:
FIG. 4 illustrates an example of a download description table according to the first exemplary embodiment of the present invention.

FIG. 4 illustrates an example of the download description table stored in the server 200. In the present exemplary embodiment, the download description table is created for each device 100 that is managed by the server 200.

In FIG. 4, a KEY 401 is a keyword (error occurrence keyword) about a failure (error) which occurs in the device 100. The KEY 401 is expressed as "Module Name: Operational State". An UPDATE TIME 402 is "time to update firmware" and associated with the keyword registered as the KEY 401.

"SLP: REBOOT" indicates occurrence of a failure that the device 100 is rebooted every time a serial link protocol (SLP) packet is received. In the example illustrated in FIG. 4, "Immediately" that indicates "immediately" starting download is registered as to "SLP: REBOOT". "RDS: COUNTER ERROR" indicates occurrence of an error in transmission in a counter transmission module that performs counter transmission within 24 hours. In the example illustrated in FIG. 4, "Less than 24 hours" that indicates starting download "within 24 hours" during which a next error is expected to occur is registered as to "RDS: COUNTER ERROR".

"PCL: PROCESS ERROR" indicates occurrence of a print error in a printer control language (PCL). In the example illustrated in FIG. 4, "Immediately" that indicates "immediately" starting download is registered as to "PCL: PROCESS ERROR". "SCON: SLEEP ERROR" indicates occurrence of an error in a power control system. In the example illustrated in FIG. 4, "Before Sleeping" that indicates performing download by "shift to a sleep mode" during which a next error is expected to occur is registered as to the "SCON: SLEEP ERROR".

"UI: MESSAGE ERROR" indicates occurrence of an error relating to a message (statement) to be displayed on a user interface (UI). In the example illustrated in FIG. 4, "Less than 24 hours" that indicates starting download "within 24 hours" by decreasing urgency to perform the download is registered as to "UI: MESSAGE ERROR". "REPORT: PRINT ERROR" indicates occurrence of an error relating report output. In the example illustrated in FIG. 4, "Before next time" that indicates performing the download by "before time to output a next report" is registered as to "REPORT: PRINT ERROR".

In the present exemplary embodiment, the UPDATE TIME 402 that is updating time of the firmware and registered in association with the KEY 401 is described as an example. However, it is not always necessary to register the updating time itself. Any other information can be used to determine the updating time of the firmware. For example, instead of the UPDATE TIME 402, an updating level may be registered. In such a case, timing to download the firmware may be determined based on a value of the updating level. For example, an updating level corresponding to "Immediately" is set to a level 1. An updating level corresponding to "Before Sleeping" and "Before next time" is set to a level 2. Further, an updating level corresponding to "Less than 24 hours" is set to a level 3. Then, control is performed such that the firmware is downloaded immediately when the level 1 is registered, within one hour when the level 2 is registered, and within 24 hours when the level 3 is registered.

Figure 5:
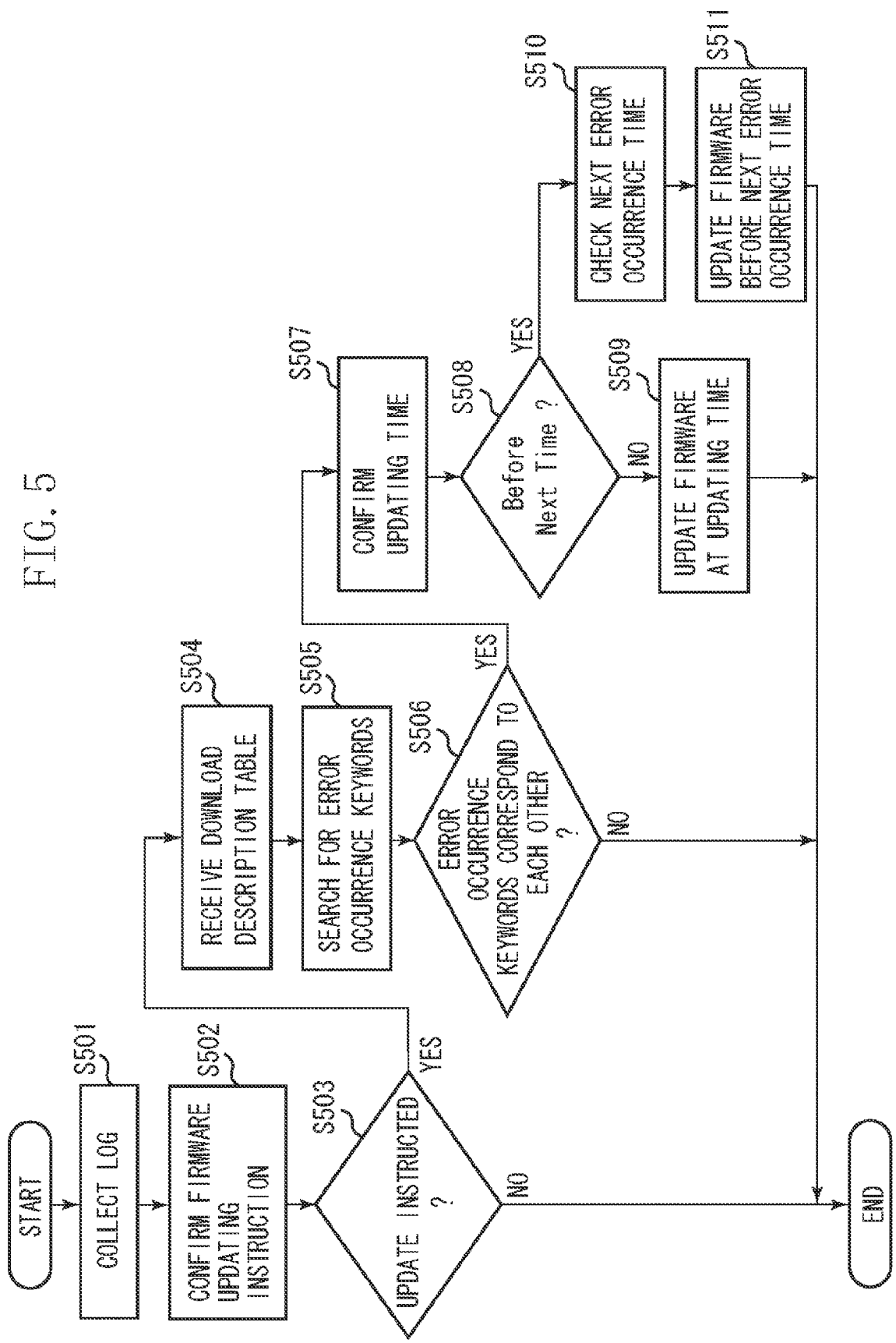
FIG. 5 is a flowchart illustrating an example of processing performed in the device according to the first exemplary embodiment of the present invention.

An example of processing performed in the device 100 is described with reference to the flowchart in FIG. 5. The flowchart in FIG. 5 is implemented, for example, by the CPU 101 in the device 100 executing a program (software) such as firmware stored in the ROM 103.

In step S501, the CPU 101 sequentially collects a log in which an internal operational state of the device 100 is recorded.

As described above, in the present exemplary embodiment, for example, an example of operational state information (error information) is realized by the log in which the internal operational state of the device 100 is recorded, and an example of an acquisition unit is realized by implementing the processing in step S501.

In step S502, the CPU 101 checks the server 200 whether an instruction to update the firmware is issued. In this step, it is possible to determine whether the instruction to update the firmware is issued at the device 100 side without checking the server 200. In such a case, the device 100 issues the firmware updating instruction to the server 200.

In step S503, the CPU 101 determines whether the firmware updating instruction is issued from the server 200. As a result of the determination, when the firmware updating instruction is not issued (NO in step S503), the processing according to the flowchart in FIG. 5 ends.

On the other hand, when the firmware updating instruction is issued (YES in step S503), the processing proceeds to step S504. In step S504, the CPU 101 acquires the download description table illustrated in FIG. 4 from the server 200.

In step S505, the CPU 101 searches for error occurrence keywords from a content of the log collected in step S501 and a content of the KEY 401 in the download description file acquired in step S504 respectively.

In step S506, based on a result of the search in step S505, the CPU 101 determines whether the error occurrence keyword obtained from the log corresponds to the error occurrence keyword registered in the download description file (KEY 401).

As described above, in the present exemplary embodiment, for example, an example of a transmission timing management table is realized by the download description table illustrated in FIG. 4. Further, for example, an identifier and transmission timing determination information are realized respectively by the information in the KEY 401 in the download description table, and the information in the UPDATE TIME 402. The server 200 realizes an example of a storage unit by storing the download description table. Further, for example, the server 200 realizes an example of a second acquisition unit by performing the processing in step S504.

As a result of the determination in step S506, when the error occurrence keyword obtained from the log does not correspond to the error occurrence keyword registered in the download description file (KEY 401) (NO in step S506), the processing according to the flowchart in FIG. 5 ends.

When the error occurrence keyword obtained from the log corresponds to the error occurrence keyword registered in the download description file (KEY 401) (YES in step S506), the processing proceeds to step S507. In step S507, the CPU 101 checks a content (updating time) of the UPDATE TIME 402 that is associated with the error occurrence keyword corresponding to the error occurrence keyword obtained from the log and registered in the download description file.

In step S508, the CPU 101 determines whether the updating time checked in step S507 is "Before Next time". As a result of the determination, when the updating time checked in step S507 is not "Before Next time" (NO in step S508), the processing proceeds to step S509. When the updating time checked in step S507 is "Before Next time" (YES in step S508), the processing proceeds to step S510.

In step S509, the CPU 101 updates the firmware transmitted from the server 200 according to the updating time checked in step S507.

In step S510, the CPU 101 calculates next error occurrence time based on setting in device operational information that indicates operation of the device. In the example illustrated in FIG. 4, next report output time is calculated.

In step S511, the CPU 101 updates the firmware transmitted from the server 200 before the next error occurrence time acquired in step S510.

As described above, in the present exemplary embodiment, for example, an example of a determination unit is realized by performing the processing of steps S506 to S511. Further, for example, the server 200 realizes an example of a transmission unit by transmitting the firmware to the device 100 in steps S509 and S511.

As described above, in the present exemplary embodiment, a failure expected to occur in the device 100 is associated with the updating time of the firmware and registered in the download description table stored in the server 200 in advance. Upon receiving an instruction to update the firmware from the server 200, the device 100 acquires the download description table from the server 200. Then, the device 100 checks a record of the failure occurred in the own device with the download description table. When the failure that has occurred in the own device is registered in the download description table, the device 100 updates the firmware at timing of the updating time associated with the failure.

Accordingly, even if the server 200 transmits the firmware to a lot of devices 100, the timing to update the firmware can be changed depending on previous operation of the devices 100. Thus, a load on the server 200 can be reduced, and the firmware can be effectively transmitted. Further, also the device 100 can effectively download the firmware, and data traffic on the network interconnecting the device 100 and the server 200 can be reduced.

In step S509, the firmware is updated according to the updating time specified by the UPDATE TIME 402. Accordingly, when "Immediately" is specified in the UPDATE TIME 402, the CPU 101 immediately updates the firmware.

In the present exemplary embodiment, when the error occurrence keywords do not correspond to each other in step S506, the processing ends without doing any processing. However, in such a case, the firmware may be regularly (for example, once a month) downloaded.

Further, in the present exemplary embodiment, the log is collected in step S501. However, instead of collecting the log, it is possible to simply monitor an error in the device 100. Further, as described above, the updating levels can be used instead of the UPDATE TIME 402 (updating time). Timing to download may be determined according to the updating level and the download may be executed. Further, when the download of the firmware from the server 200 failed, a frequency that the device 100 retries processing (for example, requesting the server 200 to transmit the firmware) when an error occurs may be changed according to the updating time or the updating level. In such a case, the device 100 requests the server 200 to retransmit the firmware according to the changed frequency. In the present exemplary embodiment, for example, an example of a request unit and a second determination unit is realized by the modification.

Although the present exemplary embodiment has described a case in which the firmware is transmitted, software (for example, an application program) other than the firmware may be transmitted.

A second exemplary embodiment of the present invention is described. In the above-described first exemplary embodiment, the device 100 determining the timing to update the firmware is described as an example. In the second exemplary embodiment, the server 200 determining the timing to update the firmware is described as an example. The second exemplary embodiment differs from the above-described first exemplary embodiment in a device for determining the timing to update the firmware. Accordingly, in the following description in the second exemplary embodiment, parts similar to those in the above-described first exemplary embodiment are designated by the same reference numerals as those in FIGS. 1 to 7, and detailed descriptions are omitted. For example, an internal configuration of a server and a device may be realized by a configuration similar to that in the first exemplary embodiment.

Figure 6:
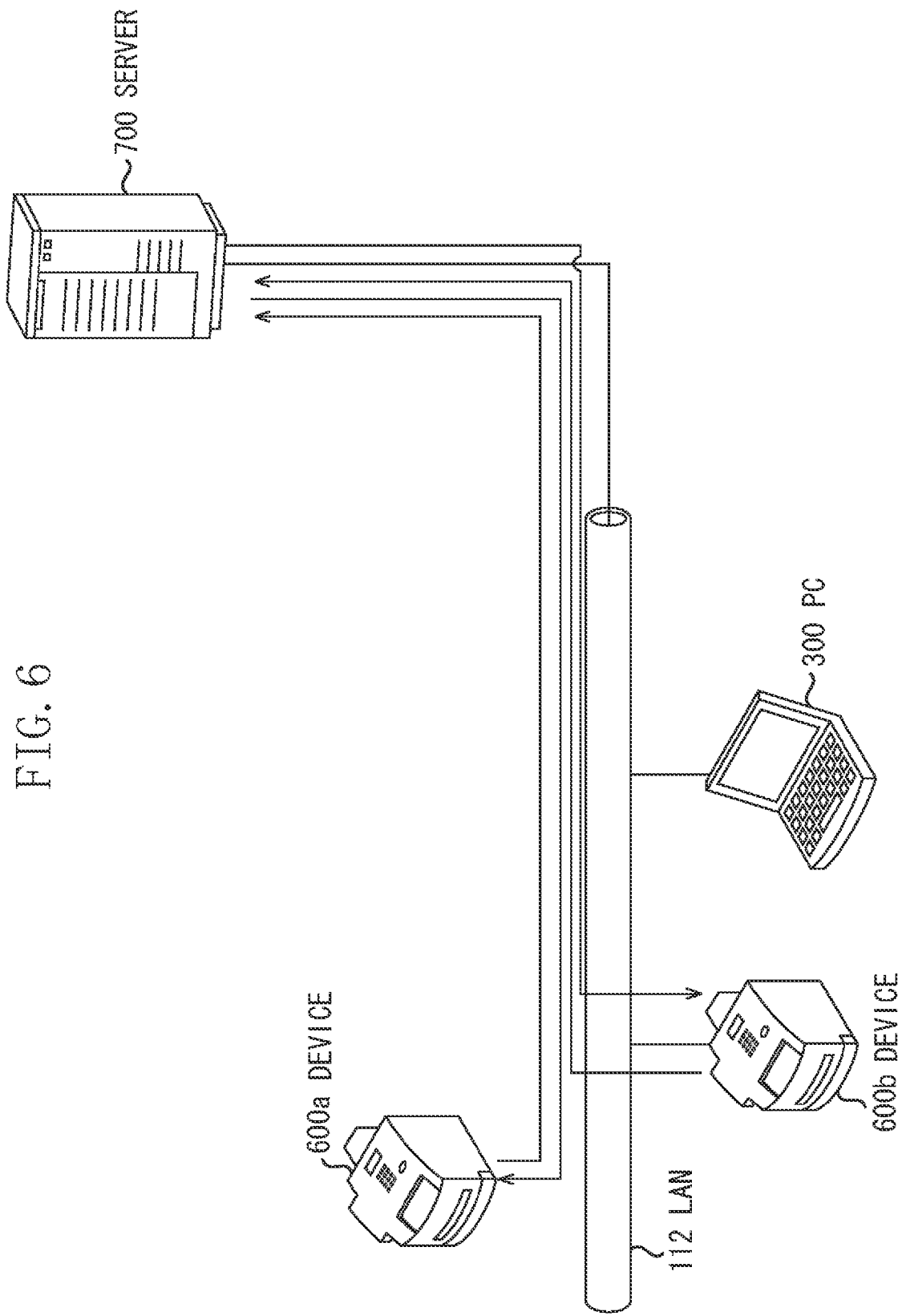
FIG. 6 illustrates an example of an entire configuration of a firmware transmission system according to a second exemplary embodiment of the present invention.

FIG. 6 illustrates an example of an entire configuration of a firmware transmission system according to the second exemplary embodiment of the present invention. In FIG. 6, each arrow between devices 600*a* and 600*b* and a server 700 indicates a flow of data or an instruction.

The devices 600 can receive a print job from the PC 300 and perform copying or the like according to operation of the devices 600 by a user. Each of the devices 600 regularly checks the server 700 whether an instruction to update its own firmware is issued. The server 700 can update a download description file (described below with reference FIG. 7) and transmit updatable firmware to the devices 600.

The configurations of the server 700, the devices 600, and the PC 300 are not limited to those illustrated in FIGS. 1, 2, and 6, and a combination of one or a plurality of the server 700, the devices 600, and the PC 300 may be used. Further, similar to FIG. 3, the server 700, the devices 600, and the PC 300 may form a system to communicate with each other via the Internet 212.

As described above, in the present exemplary embodiment, for example, an example of the device is realized by the devices 600, and an example of the transmission device is realized by the server 700.

Figure 7:
FIG. 7 illustrates an example of a download description table according to the second exemplary embodiment of the present invention.

FIG. 7 illustrates an example of a download description table stored in the server 700. In the present exemplary embodiment, similar to the first exemplary embodiment, the download description table is created for each device 600 that is managed by the server 700.

The download description table illustrated in FIG. 7 is basically similar to that illustrated in FIG. 4. More specifically, a KEY 701 is a keyword (error occurrence keyword) about a failure which occurs in the device 600. The KEY 701 is expressed as "Module Name: Operational State". An UPDATE TIME 702 is "time to update firmware" and associated with the keyword registered as the KEY 701.

"SLP: REBOOT" indicates occurrence of a failure that the device 100 is rebooted every time an SLP packet is received. In the example illustrated in FIG. 7, "Immediately" that indicates "immediately" starting download is registered as to "SLP: REBOOT". "RDS: COUNTER ERROR" indicates occurrence of an error in transmission in a counter transmission module that performs counter transmission within 24 hours. In the example illustrated in FIG. 7, "Less than 24 hours" that indicates starting download "within 24 hours" during which a next error is expected to occur is registered as to "RDS: COUNTER ERROR".

"PCL: PROCESS ERROR" indicates occurrence of a print error in a PCL. In the example illustrated in FIG. 7, "Immediately" that indicates "immediately" starting download is registered as to "PCL: PROCESS ERROR". "UI: MESSAGE ERROR" indicates occurrence of an error relating to a message (statement) to be displayed on an UI. In the example illustrated in FIG. 7, "Less than 24 hours" that indicates starting download "within 24 hours" by decreasing urgency to perform the download is registered as to "UI: MESSAGE ERROR".

In the present exemplary embodiment, the UPDATE TIME 702 that is time to update the firmware and registered in association with the KEY 701 is described as an example. However, as described in the first exemplary embodiment, the updating levels other than the updating time may be registered instead of the UPDATE TIME 702.

An example of processing performed in the server 700 is described with reference to the flowchart in FIG. 8.

In step S801, the CPU 201 checks whether to issue an instruction to update the firmware to each device 600. The server 700 can determine whether the instruction to update the firmware is issued by each device 600.

In step S802, the CPU 201 determines whether the instruction to update the firmware is issued to the device. As a result of the determination, when there is no device which is instructed to update the firmware (NO in step S802), the processing according to the flowchart in FIG. 8 ends.

On the other hand, when there is any device which is instructed to update (YES in step S802), the processing proceeds to step S803. In step S803, the CPU 201 acquires a log in which an internal operational state of the device 600 is recorded from the device 600.

As described above, in the present exemplary embodiment, for example, an example of the operational state information (error information) is realized by the log in which the internal operational state of the device 600 is recorded, and an example of the acquisition unit is realized by implementing the processing in step S803.

In step S804, the CPU 201 analyzes the download description table illustrated in FIG. 7.

In step S805, the CPU 201 searches for error occurrence keywords from a content of the log acquired in step S803 and a content of the KEY 701 in the download description file analyzed in step S804 respectively.

In step S806, based on a result of the search in step S805, the CPU 201 determines whether the error occurrence keyword obtained from the log corresponds to the error occurrence keyword registered in the download description file (KEY 701).

As described above, in the present exemplary embodiment, for example, an example of the transmission timing management table is realized by the download description table illustrated in FIG. 7. Further, for example, the identifier and the transmission timing determination information are realized by the information in the KEY 701 in the download description table, and the information in the UPDATE TIME 702 respectively. Further, the server 700 realizes an example of the storage unit by storing the download description table.

As a result of the determination in step S806, when the error occurrence keyword obtained from the log does not correspond to the error occurrence keyword registered in the download description file (KEY 701) (NO in step S806), the processing according to the flowchart in FIG. 8 ends.

When the error occurrence keyword obtained from the log corresponds to the error occurrence keyword registered in the download description file (KEY 701) (YES in step S806), the processing proceeds to step S807. In step S807, the CPU 201 checks a content (updating time) of the UPDATE TIME 702 that is associated with the error occurrence keyword corresponding to the error occurrence keyword obtained from the log and registered in the download description file.

In step S808, the CPU 201 determines whether the updating time checked in step S807 is "Immediately". As a result of the determination, when the updating time checked in step S807 is "Immediately" (YES in step S808), the processing proceeds to step S809. When the updating time checked in step S807 is not "Immediately" (NO in step S808), the processing proceeds to step S810.

In step S810, the CPU 201 transmits the firmware to the corresponding device 600 according to the updating time checked in step S807, and instructs the device 600 to update the firmware.

In step S809, the CPU 201 immediately transmits the firmware to the corresponding device 600 and instructs the device 600 to update the firmware.

As described above, in the present exemplary embodiment, for example, an example of the determination unit is realized by performing the processing in steps S806 to S810.

Accordingly, if the timing to update the firmware is determined at the server 700 side, an effect similar to that in the above-described first exemplary embodiment can be obtained.

In the present exemplary embodiment, when the error occurrence keywords do not correspond to each other in step S806, the processing ends without doing any processing. However, in such a case, the firmware may be regularly (for example, once a month) downloaded.

In the present exemplary embodiment, the log is acquired in step S803. However, instead of acquiring the log, it is possible to simply monitor an error in the device 600.

Further, as described above, the updating levels can be used instead of the UPDATE TIME 702 (updating time). Timing to download may be determined according to the updating level and the download may be executed.

Similar to the first exemplary embodiment, when the download of the firmware from the server 700 failed, a frequency that the device 600 retries the processing when an error occurs may be changed according to the updating time or the updating level. In such a case, the device 600 requests the server 200 to retransmit the firmware according to the changed frequency. In the present exemplary embodiment, for example, an example of the request unit and the second determination unit is realized by the modification. Further, similar to the first exemplary embodiment, software (for example, an application program) other than the firmware may be transmitted.

Each unit that configures the software transmission system and each step in the method for transmitting the software according to the above-described exemplary embodiments may be implemented by executing a program stored in a random access memory (RAM), or a read-only memory (ROM) in a computer. In such a case, the program and a computer-readable recording medium that stores the program constitute the present invention.

The present invention may be applied, for example, to a system, an apparatus, a method, a program, or a storage medium. More specifically, the present invention may be applied to a system including a plurality of devices or an apparatus consisting of a single device.

Further, the present invention includes a case where a program (i.e., the program corresponding to the flowcharts illustrated in FIGS. 5 and 8 in the exemplary embodiments) of software for implementing the functions of the above-described exemplary embodiments may be directly, or remotely provided to a system or an apparatus. Then, a computer in the system or the apparatus may read and execute the provided program code.

Accordingly, the program code itself that is installed in the computer to implement the functional processing according to the exemplary embodiments constitutes the present invention. That is, the present invention includes the computer program that implements the functional processing according to the exemplary embodiments of the present invention.

In such a case, as long as the function of the program is implemented, any form, for example, an object code, a program implemented by an interpreter, or a script data to be supplied to an operating system (OS) may be employed.

As the storage medium for supplying the program, for example, a floppy disk, a hard disk, an optical disk, a magneto-optical disk (MO), a compact disk read-only memory (CD-ROM), a compact disk recordable (CD-R), and a compact disk rewritable (CD-RW) may be employed. Further, a magnetic tape, a nonvolatile memory card, a ROM, and a digital versatile disk (DVD) (DVD-ROM, DVD-R) may be employed.

In addition, the program may be supplied by connecting to a website in the Internet using a browser in a client computer. Then, the computer program may be supplied from the website by downloading the computer program itself according to the exemplary embodiments of the present invention or a compressed file including an automatic installation function into a storage medium such as a hard disk.

Further, the program code constituting the program according to the exemplary embodiments of the present invention may be divided into a plurality of files, and each file may be downloaded from different websites. Thus, a world wide web (WWW) server that allows a plurality of users to download the program file for realizing the functional processing according to the exemplary embodiments of the present invention in the computer is also included in the present invention.

Further, the program according to the exemplary embodiments of the present invention may be encrypted and stored in a storage medium such as a CD-ROM, and distributed to users. A user who satisfies prescribed conditions is allowed to download key information for decrypting the program from a website via the Internet. Using the downloaded key information, the user can install the encrypted program into the computer and execute the program to implement the present invention.

The functions according to the exemplary embodiments described above may be implemented by executing the read program by the computer. The above-described functions according to the exemplary embodiments may be implemented by executing a part or the whole of the actual processing using an OS working on the computer based on an instruction of the program.

Further, the program read from the storage medium may be written in a memory which is provided in a function expansion board inserted in the computer or in a function expansion unit connected to the computer. Then, based on an instruction according to the program, the CPU provided in the function expansion board or the function expansion unit executes a part or the whole of the actual processing to realize the functions according to above-described exemplary embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application 2008-172804 filed Jul. 1, 2008, which is hereby incorporated by reference herein in its entirety.

What is claimed is:

1. A program transmission system in which a program is transmitted from a transmission apparatus to an image forming apparatus, the program transmission system comprising:
   an acquisition unit configured to acquire operational state information about an operational state in the image forming apparatus;
   a determination unit configured to determine timing to transmit the program to the image forming apparatus according to the operational state based on the operational state information acquired by the acquisition unit;
   a transmission unit configured to transmit the program from the transmission apparatus to the image forming apparatus according to the timing determined by the determination unit; and
   a storage unit configured to store a transmission timing management table in which an identifier for identifying the operational state in the image forming apparatus and transmission timing determination information for determining the timing to transmit the program according to the operational state are associated with each other and registered,
   wherein the determination unit determines the timing to transmit the program to the image forming apparatus based on the transmission timing determination information that is associated with the identifier for identifying the operational state based on the operational state information acquired by the acquisition unit and registered in the transmission timing management table,
   wherein the determination unit determines to use predetermined timing as the timing to transmit the program to the image forming apparatus when the identifier for identifying the operational state based on the operational state information acquired by the acquisition unit is not registered in the transmission timing management table.

2. The program transmission system according to claim 1, wherein the transmission apparatus includes the storage unit; the image forming apparatus includes the acquisition unit and the determination unit; and the image forming apparatus further includes a second acquisition unit configured to acquire the transmission timing management table stored by the storage unit from the transmission apparatus.

3. The program transmission system according to claim 1, wherein the determination unit calculates time that the image forming apparatus shifts to the next operational state acquired by the acquisition unit based on the information indicating the operation in the image forming apparatus and determines calculated time as the timing to transmit the program to the image forming apparatus.

4. The program transmission system according to claim 1, wherein the transmission apparatus includes the acquisition unit, the storage unit, and the determination unit.

5. The program transmission system according to claim 1, further comprising:
   a second determination unit configured to determine, when download of the program from the transmission apparatus to the image forming apparatus failed, a frequency to request the transmission apparatus to retransmit the program based on transmission timing determination information that is associated with an identifier for identifying the operational state based on the operational state information acquired by the acquisition unit, and is registered in the transmission timing management table; and
   a request unit configured to request the transmission apparatus to transmit the program at the frequency determined by the second determination unit.

6. The program transmission system according to claim 1, wherein the acquisition unit acquires error information about an error occurred in the image forming apparatus; and
   the determination unit determines the timing to transmit the program to the image forming apparatus according to a content of the error based on the error information acquired by the acquisition unit.

7. A method for transmitting a program from a transmission apparatus to an image forming apparatus, the method comprising:
   acquiring operational state information about an operational state in the image forming apparatus;
   determining timing to transmit the program to the image forming apparatus according to the operational state based on the acquired operational state information;
   instructing the transmission apparatus to transmit the program to the image forming apparatus according to the determined timing; and
   storing a transmission timing management table in which an identifier for identifying the operational state in the image forming apparatus and transmission timing determination information for determining the timing to transmit the program according to the operational state are associated with each other and registered,
   wherein the determining determines the timing to transmit the program to the image forming apparatus based on the transmission timing determination information that is associated with the identifier for identifying the operational state based on the acquired operational state information and registered in the transmission timing management table,
   wherein the determining determines to use predetermined timing as the timing to transmit the program to the image forming apparatus when the identifier for identifying the operational state based on the acquired operational state information is not registered in the transmission timing management table.

8. A non-transitory computer-readable storage medium storing a control program for instructing a computer to execute a method for transmitting a program from a transmission apparatus to an image forming apparatus, the method comprising:
   acquiring operational state information about an operational state in the image forming apparatus;
   determining timing to transmit the program to the image forming apparatus according to the operational state based on the acquired operational state information;
   instructing the transmission apparatus to transmit the program to the image forming apparatus according to the determined timing; and
   storing a transmission timing management table in which an identifier for identifying the operational state in the image forming apparatus and transmission timing determination information for determining the timing to transmit the program according to the operational state are associated with each other and registered,
   wherein the determining determines the timing to transmit the program to the image forming apparatus based on the transmission timing determination information that is associated with the identifier for identifying the operational state based on the acquired operational state information and registered in the transmission timing management table,
   wherein the determining determines to use predetermined timing as the timing to transmit the program to the image forming apparatus when the identifier for identifying the operational state based on the acquired operational state information is not registered in the transmission timing management table.

9. An image forming apparatus comprising:
   an acquisition unit configured to acquire operational state information about an operational state in the image forming apparatus;
   a determination unit configured to determine timing to transmit a program to the image forming apparatus according to the operational state based on the operational state information acquired by the acquisition unit;
   a reception unit configured to receive the program transmitted from a transmission apparatus to the image forming apparatus according to the timing determined by the determination unit; and
   a storage unit configured to store a transmission timing management table in which an identifier for identifying the operational state in the image forming apparatus and transmission timing determination information for determining the timing to transmit the program according to the operational state are associated with each other and registered,
   wherein the determination unit determines the timing to transmit the program to the image forming apparatus based on the transmission timing determination information that is associated with the identifier for identifying the operational state based on the operational state information acquired by the acquisition unit and registered in the transmission timing management table,
   wherein the determination unit determines to use predetermined timing as the timing to transmit the program to the image forming apparatus when the identifier for identifying the operational state based on the operational state information acquired by the acquisition unit is not registered in the transmission timing management table.

10. A method for controlling an image forming apparatus, the method comprising:

acquiring operational state information about an operational state in the image forming apparatus;

determining timing to transmit a program to the image forming apparatus according to the operational state based on the acquired operational state information;

receiving the program transmitted from a transmission apparatus to the image forming apparatus according to the determined timing; and storing a transmission timing management table in which an identifier for identifying the operational state in the image forming apparatus and transmission timing determination information for determining the timing to transmit the program according to the operational state are associated with each other and registered, wherein the determining determines the timing to transmit the program to the image forming apparatus based on the transmission timing determination information that is associated with the identifier for identifying the operational state based on the acquired operational state information and registered in the transmission timing management table, wherein the determining determines to use predetermined timing as the timing to transmit the program to the image forming apparatus when the identifier for identifying the operational state based on the acquired operational state information is not registered in the transmission timing management table.

11. A non-transitory computer-readable storage medium storing a control program for instructing a computer to execute a method for controlling an image forming apparatus, the method comprising:

acquiring operational state information about an operational state in the image forming apparatus;

determining timing to transmit a program to the image forming apparatus according to the operational state based on the acquired operational state information;

receiving the program transmitted from a transmission apparatus to the image forming apparatus according to the determined timing; and storing a transmission timing management table in which an identifier for identifying the operational state in the image forming apparatus and transmission timing determination information for determining the timing to transmit the program according to the operational state are associated with each other and registered, wherein the determining determines the timing to transmit the program to the image forming apparatus based on the transmission timing determination information that is associated with the identifier for identifying the operational state based on the acquired operational state information and registered in the transmission timing management table, wherein the determining determines to use predetermined timing as the timing to transmit the program to the image forming apparatus when the identifier for identifying the operational state based on the acquired operational state information is not registered in the transmission timing management table.

* * * * *